Nov. 16, 1954　　　H. O. KRON　　　2,694,320
VALVE CONTROL

Filed Dec. 9, 1952　　　　　　　　　　　5 Sheets-Sheet 1

Fig. I.

INVENTOR
Harold O. Kron
BY
Arthur Middleton
ATTORNEY

Nov. 16, 1954   H. O. KRON   2,694,320
VALVE CONTROL

Filed Dec. 9, 1952   5 Sheets-Sheet 2

INVENTOR
Harold O. Kron
BY Arthur Middleton
ATTORNEY

Nov. 16, 1954

H. O. KRON 2,694,320

VALVE CONTROL

Filed Dec. 9, 1952

INVENTOR
Harold O. Kron

BY
ATTORNEY

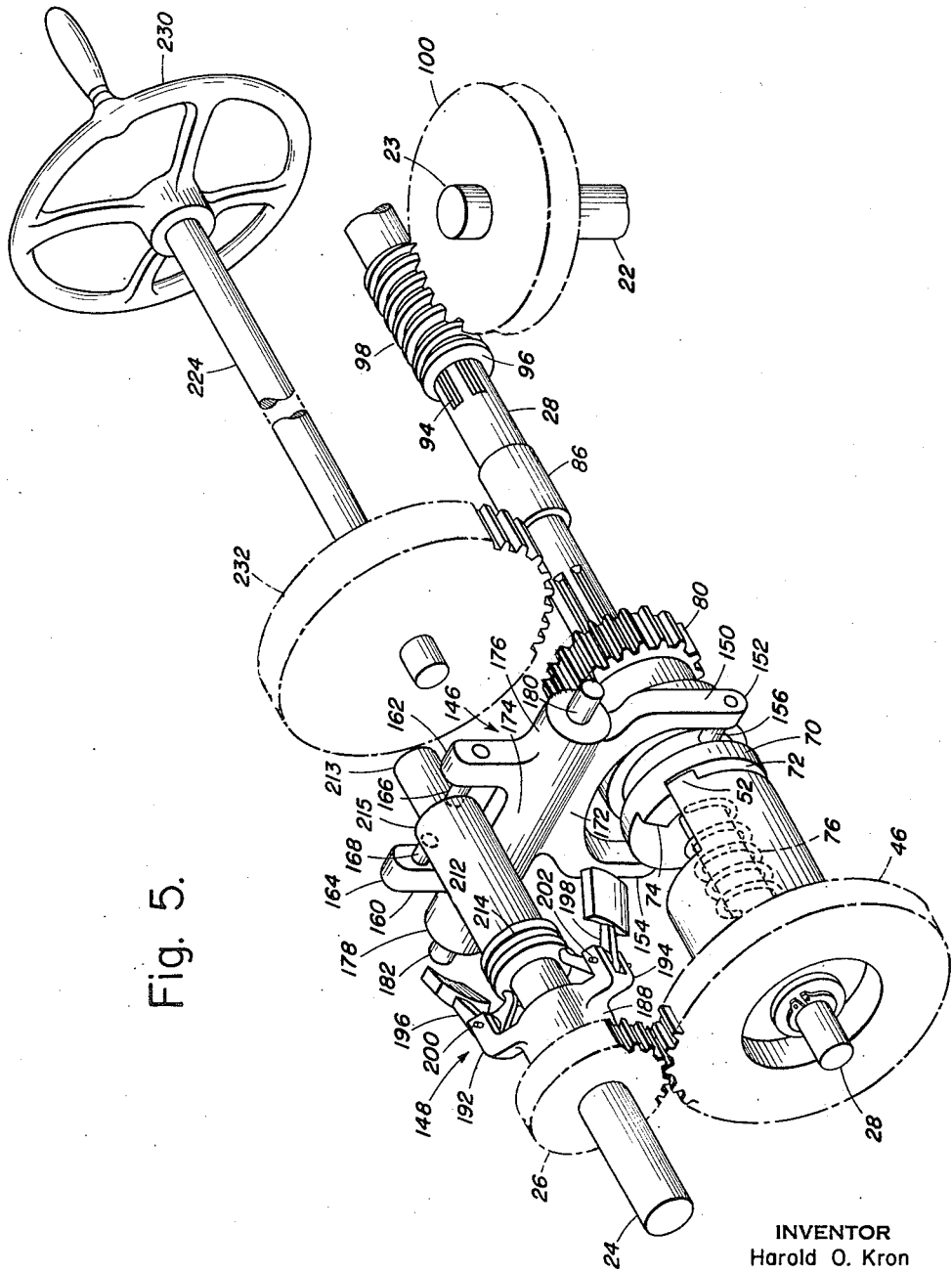

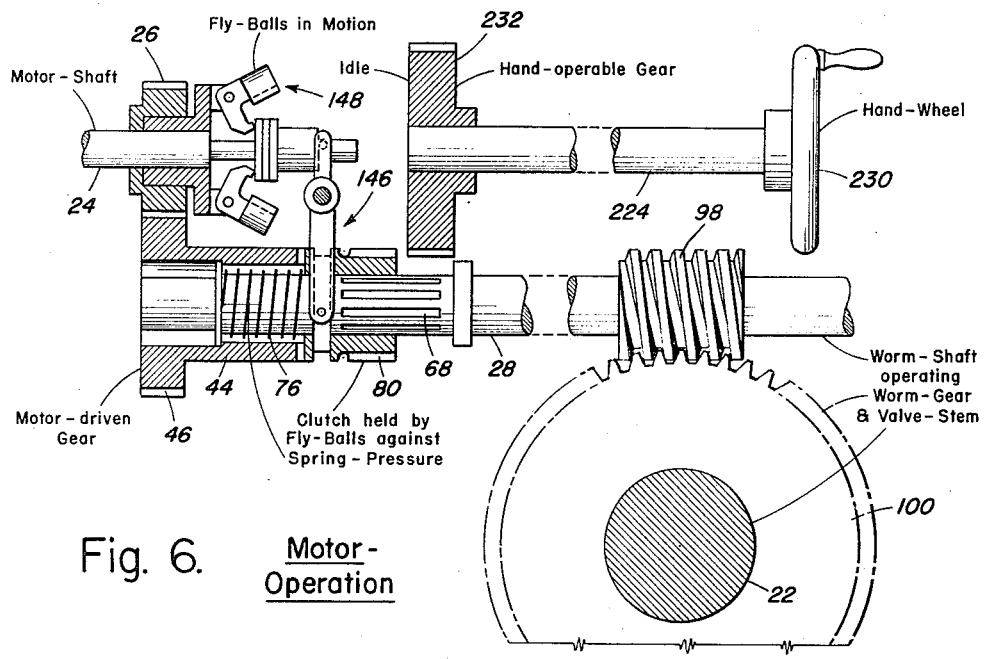
Fig. 6. Motor-Operation
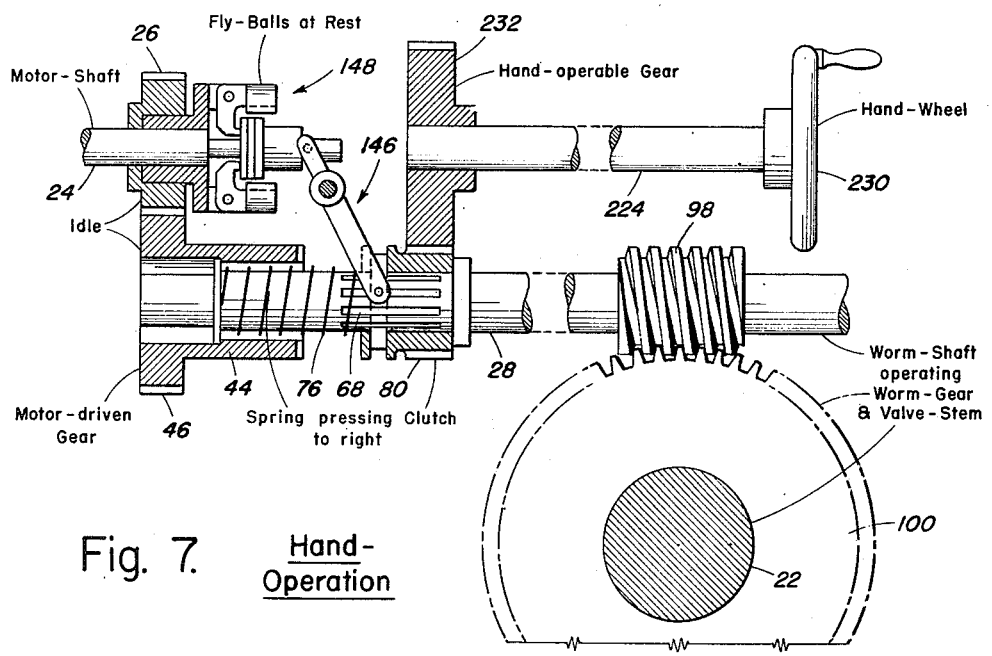
Fig. 7. Hand-Operation 2,694,320
Patented Nov. 16, 1954

2,694,320

VALVE CONTROL

Harold O. Kron, Philadelphia, Pa., assignor to Philadelphia Gear Works, Inc., Philadelphia, Pa., a corporation of Pennsylvania Application December 9, 1952, Serial No. 324,995

18 Claims. (Cl. 74—625)

The present invention relates to improvements in dual valve operators that may be electively either motor-driven or hand-operated and more particularly relates to automatically-operable de-clutching of the valve-stem operating mechanisms for effecting motor-drive of the valve-stem while simultaneously rendering inoperative the connection between the hand-operator and the valve-stem. An example of the type of control over which the present invention is an improvement is shown in the patent to Ball No. 2,114,013.

In Patent No. 2,114,013, there is elective operation of the valve-stem to open and close the valve, by motor-driven operation and by hand operation. When the motor-drive is in effect, hand operation is disconnected, and when hand operation is in effect, the motor-drive is disconnected. If, however, the motor-drive should be energized while the hand operation is in effect, that latter is immediately disconnected so the hand operator will not be injured. The motor-drive is normally connected at all times, so it is required that the operator manually disconnect the motor drive by moving a lever before he can operate the valve-stem by hand.

It is among the objects of the present invention to improve upon the arrangement of that patent.

In the showing of that patent, the valve-stem is motor-operated by a rotatable valve-stem clutching worm-gear that has meshing with it a worm on a motor-driven shaft. When the valve-stem is to be hand-operated, the operator moves a lever to de-clutch the worm-gear from the valve-stem and clutch the hand-wheel to the valve-stem.

It is an object of this invention to provide an arrangement in the instant assembly so that the clutch mechanism, whose reciprocation connects either the hand-wheel drive or the motor drive to the valve-stem, can encircle the worm-shaft rather than the valve-stem, so as to result in an extremely compact arrangement.

Still another object of the present invention is to improvise means for automatically disconnecting the hand operation of the valve stem upon actuation of the motor-drive such that upon deactuation of the motor drive the arrangement automatically reassumes its relationship, for hand operation, thereby entirely obviating the necessity of various hand operated means for changing from hand-operation to motor-drive, or vice versa.

Another object of this invention is to provide an improved automatically actuated yoke means for shifting the operation of the valve from hand-operation to motor-operation wherein the yoke means is substantially balanced so as to require a minimum of force to be applied thereto for effecting disconnection of the hand driven gear with the slidable gear on the worm shaft and for effecting clutching for motor-drive, and also for minimizing the spring size requirement for effecting return of the yoke means to the declutching position, upon deactuation of the motor-drive, the spring thereby affording a minimum of resistance to automatic clutching.

These objects, and possibly others, can be attained in the drive mechanism for a worm-gear operated valve-stem that is thereby opened and closed due to rotation of a shaft having a worm that co-acts with the worm-gear, with that worm-shaft normally rotated by a manually-operable hand-wheel on a shaft parallel to the worm-shaft. The connection between the hand-wheel shaft and the worm-shaft includes a gear on the hand-wheel shaft and a normally enmeshed slidable gear on the worm-shaft. There is a reciprocable clutch member slidably carried by the worm-shaft and having the slidable gear unitary therewith, which clutch member can automatically be moved upon actuation of the motor-drive to a clutching position connecting the motor-drive with the worm-shaft after disengaging the enmeshed gears of the hand operation. De-energization of the motor-drive automatically releases the clutch member from its clutching position and a spring urges the latter from the clutching position to the position wherein the slidable gear and the gear on the hand-wheel shaft are enmeshed for hand-operation of the valve stem.

The clutch member is automatically moved by a rockable yoke which is pivoted by rotation of a flyball mechanism, the latter being mounted on a motor-driven shaft so as to effect pivoting of the yoke upon energization of the motor-drive.

A feature of this invention is the provision of an improved substantially balanced, vertically disposed, clutch-shifting yoke means in the mechanism for effecting clutching and de-clutching, the balance being provided by oppositely extending U-shaped portions joined at their bights with bearing portions extending from the bights and substantially coplanar with the U-shaped portions, one of the U-shaped portions being adapted to be engaged for effecting pivoting of the yoke means, while the other of the U-shaped portions is adapted to be engaged with the slidable clutch member for reciprocating the same between its clutching and de-clutching positions.

Another feature of this invention is that the requirement for power transmitting elements of a thrust-imparting nature is substantially minimized, as is the number of power transmitting elements in the train between either the motor or the hand drive and the valve-stem. Resulting from this feature, the mechanism can be of simple arrangement and also mounted in its housing with a greater degree of accuracy as to the location of the bearings for the various shafts.

Another feature of this invention is that clutching can be effected by automatic operation of the flyball mechanism which operates through the substantially balanced yoke thereby requiring a minimum of force to be directed thereagainst.

According to a preferred embodiment of the invention, it is adapted to be employed in a valve control including a motor-drive, a worm-gear whose rotation effects opening and closing movement of the valve-stem, a shaft carrying a worm co-acting with the worm-gear, and for effecting rotation of the valve-stem a train of power-transmitting elements between the motor-drive and the worm-gear having as one of its elements a clutch including a driving element and a reciprocable driven element respectively rotatably and non-rotatably carried by the worm shaft. In this embodiment, there is a hand-motivatable mechanism that includes a shaft parallel to the worm-shaft carrying a hand-wheel and a gear, while on the worm-shaft is a spring-loaded slidable gear mounted thereon for rotation therewith and for reciprocation with the driven reciprocable element of the clutch. The slidable gear on the worm-shaft is normally enmeshed with the gear on the hand-wheel shaft and the driven clutch element has associated with it rockable yoke means automatically operable to effect clutching to interrupt the hand-operation connection between the gear on the hand-wheel shaft and the slidable gear on the worm-shaft and to effect axial movement of the slidable gear out of operative engagement with the gear on the hand-wheel shaft for motor-drive of the valve. The rockable yoke means is of substantially balanced form so as to permit of facile operation thereof.

Various other objects and advantages will become apparent from the detailed description to follow. The preferred embodiment of my invention is shown in the accompanying drawings, in which Figure 1 is a perspective view of the entire valve structure and control mechanism assembled.

Figure 5 is a partially diagrammatic enlarged detailed perspective view of the automatically operable clutching and valve-stem operating mechanism.

Figure 6 is a vertical sectional partial but rather symbolic view of the reciprocable clutch member and its controlling yoke in motor-operating connection with the flyballs in motion, while Figure 7 is a view similar to Figure 6 except that the parts are in hand-operating connection.

Figure 1:
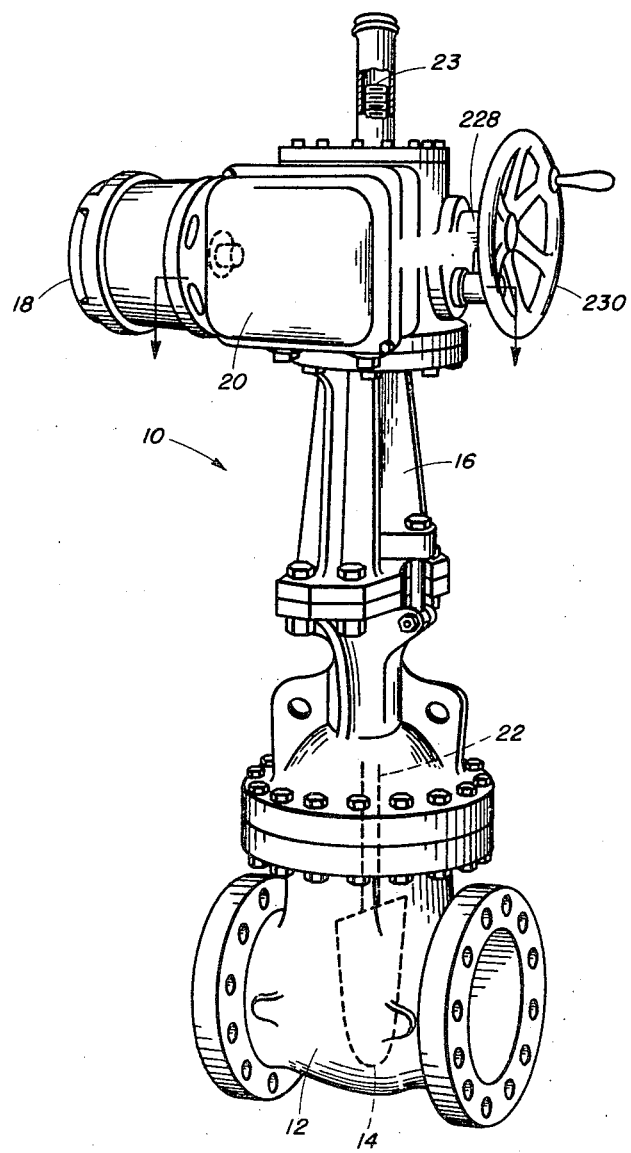

It will be seen from Figure 1 that this invention is primarily adapted to be applied to a remotely controlled motor-driven valve such as is designated generally by the numeral 10. The valve 10 includes a casing 12, an opening and closing valve-head such, for example, as gate 14, a yoke 16 being mounted atop the valve casing 12 and adapted to support the motor-drive 18 which is attached to the casing 20 wherein is disposed the power transmitting train, for motor connection between the motor 18 and the valve-stem 22, and the manually operable valve-stem operating mechanism.

The motor operation of the valve-stem 22 and valve-gate 14 will now be described in detail, attention being drawn to Figures 2, 3 and 5. The shaft 24 of the motor 18 extends within the casing 20 and has its inner end provided with a pinion 26. A worm-carrying shaft 28 (hereinafter called the worm-shaft) has one end thereof with a reduced diameter portion 30 journaled for rotation in the bearing opening 32 of the apertured plate 34 separating the motor from the casing 20. The portion 30 of the shaft is formed with a groove at 36 in which is disposed a split ring 38, and a thrust washer 40 is positioned between the ring 38 and the plate 34 so that axial movement of the worm-shaft 28 in one direction is limited thereby. On the worm-shaft portion 41 is a bushing 42 at one end abutting the ring 43 which is engaged against the ring 38 and at the other end abutting the split ring 45 carried in the groove 47 in the shaft. Rotatably carried by the bushing 42 and retained by the rings 43 and 45 is a sleeve-like element 44 having composite functions which has a motor-driven gear 46 integrally formed therewith for operative engagement with the motor pinion 26 so as to effect rotation of the sleeve-like element 44. This element 44 has the face 50 formed with a plurality of lugs 52 providing a clutch-like face engageable by the reciprocable clutch element 70.

The worm-shaft 28 has an intermediate portion 48 thereof rotatably supported by the ball bearing 54, a locking ring 56 maintaining the inner race of the bearing in abutment with the shoulder 58. The outer race of the bearing is held relative to the partition wall 60 by means of the split ring 62 and the retaining plate 64 which is secured to the partition walls by the bolts 66. The portion 48 of the worm-shaft is formed with spline grooves 68 and a reciprocable driven clutch element 70 is non-rotatably carried thereby. The end face 72 of the clutch element 70, opposing the end face 50, is provided with a plurality of lugs 74 cooperable with the lugs 52. A spring 76 is interposed between the ring 45 and the driven clutch element at the recess 78 so as to normally retain the driven clutch element out of operative engagement with the driving clutch element. The clutch element 70 has a driven and slidable gear 80 unitarily secured thereto or integrally formed therewith and for a purpose to be described in detail hereinafter. The clutch element 70 is also formed with a peripheral groove or channel 82 the function of which will become apparent in the detailed description of the automatic clutching means.

The worm-shaft 28 has a spiral thread 84 formed on hub 86 integral with shaft 28. A gear-type limit switch 88, such as is disclosed in the said patent to Ball, is geared to the sleeve 86 by the gear 90 (Figure 2), for limiting the power closing of the valve to a predetermined extent by breaking the circuit to the motor. The worm-shaft portion 92 has spline grooves 94 formed thereon and a worm sleeve 96 is reciprocably splined to the worm-shaft for rotation therewith. The sleeve 96 has external threading at 98 providing a worm for operative engagement with the worm-drive gear 100 which is horizontally disposed. The valve-stem 22 which is externally threaded at 23 is threadably engaged in the internally threaded bore of the bronze nut 102 which is mounted within the sleeve 103. The nut 102 and the sleeve 103 are locked to the gear 100 so that rotation of the worm-shaft and worm-gear effects rotation of the worm drive gear and consequent vertical axial movement of the valve-stem and gate.

The sleeve 96 has an annular recess 104 in which the rock arm 106 of the torque responsive limit switch is engaged. A detailed disclosure of the torque responsive limit switch and its operation is made in the said patent to Ball. It will be understood, therefore, that upon full closure of the valve gate or encounter of an obstruction by the valve gate, the worm-sleeve will move axially actuating the switch to stop the motor-drive.

Reference is made to the said Ball patent for a complete description of the limit switches and their mode of operation when applied to valve operating assemblies. As pointed out in the Ball patent, when the valve reaches the end of either its opening or closing movement, a limit switch is operated to stop the motor drive and also to provide for reverse operation of the motor when it is next operated.

Figure 2:
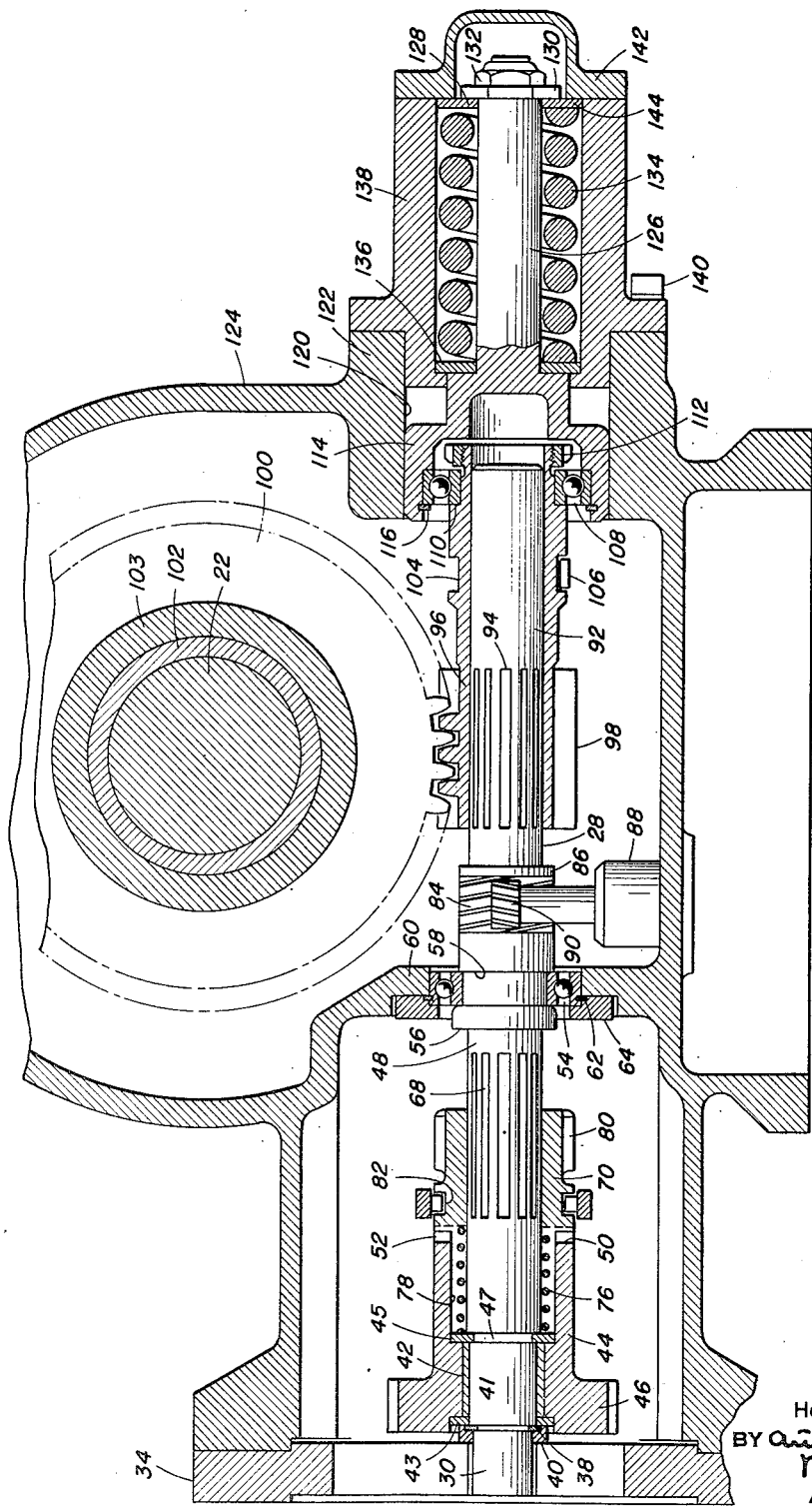
Figure 2 is a horizontal sectional view taken substantially along the plane of line 2—2 of Figure 1.
Figure 3:
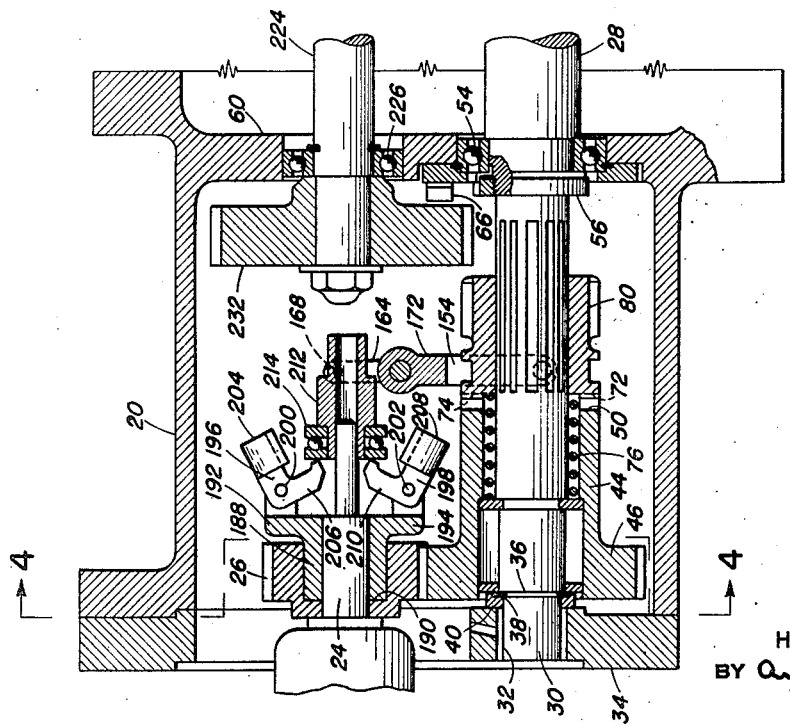
Figure 3 is a vertical longitudinal sectional view taken substantially along the plane of line 3—3 of Figure 4.

Figure 2 shows in detail the manner in which the worm-shaft is rotatably journaled and the worm-sleeve resiliently retained from axial movement. The inner race of the ball bearing 108 is engaged in the annular recess 110 and retained therein by the locking ring 112. The outer race of the bearing is mounted in the inner end of the bearing sleeve 114 and retained therein by means of the retaining snap ring 116. The bearing sleeve 114 in turn is supported within the bore 120 in the boss 122 of the casing wall 124 and has a spindle portion 126 extending axially therefrom. A spring retaining ring 128 is mounted on the outer end of the spindle and a washer 130 and nut 132 retain the ring 128 from outward movement. A thrust spring 134 encircles the spindle 126 and abuts the washer 136 at the inner end and the retainer 128 at the outer end. An outer sleeve 138 coaxial with the spindle 126 is secured to the boss 122 by bolts 140 and the outer end of the sleeve 138 is closed by the cap 142 so as to seal off the interior of the casing. The cap 142 provides a shoulder at 144 which engages the retaining ring 128 so that outward movement of the spring is limited. It will thus be seen that outward movement of the worm-sleeve will effect resilient outward movement of the bearing sleeve and spindle in opposition to the spring 134, operation of the torque responsive limit switch effecting stopping of the motor and stopping of the outward movement in opposition to the spring 134.

For hand operation of the valve, a hand-wheel shaft 224 is rotatably journaled in the casing 20 in parallel relation to the worm-shaft 28 by means of the ball bearing 226 in the partition wall 60 and a bearing at 228 (see Fig. 1). The outer end of the shaft 224 has a hand-wheel 230 secured thereto and the inner end of the shaft carries a drive gear 232 secured thereto and normally enmeshed with the slidable gear 80 on the worm-shaft.

Looking now at Figures 3 through 7, the details of the automatic means for shifting from hand-operation to motor-operation upon actuation of the motor-drive and for automatically shifting back to the arrangement for hand-operation upon deactuation of the motor-drive will be described. The means for shifting between hand- and motor- and motor- and hand-operation includes the rockable yoke means 146 and the flyball mechanism 148 for automatically operating the same. The rockable yoke means 146 includes a first U-shaped portion 150 having a pair of spaced parallel legs 152 and 154 straddling the reciprocable clutch element 70. The lower ends of the legs 152 and 154 have inwardly extending, axially aligned pins 156 and 158 carried thereby and engaged in the groove 82. The yoke means further includes a second U-shaped portion 160 extending oppositely from the first U-shaped portion and having a pair of upwardly directed legs 162 and 164. The upper ends of the legs 162 and 164 have inwardly directed, axially aligned pins 166 and 168 disposed transversely of the reduced diameter extension 213 of the sleeve 212 slidable on the motor shaft 24. The bight portions 172 and 174 of the first and second U-shaped portions are integrally joined and have extending therefrom the bearing portions 176 and 178 and bearing pins 180 and 182.

Figure 4:
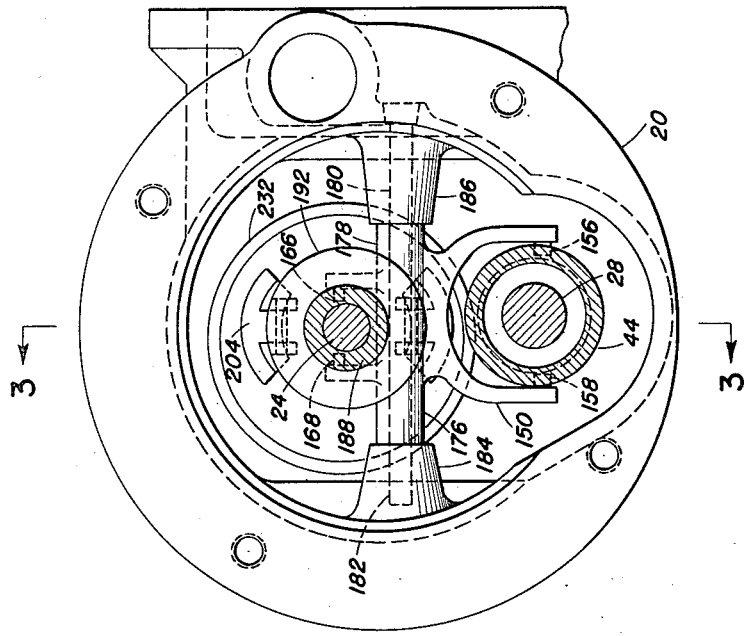
Figure 4 is a vertical transverse sectional view taken substantially along the plane of line 4—4 of Figure 3.

Figure 4 shows the pair of bosses 184 and 186 carried by the interior of the casing 20 which rotatably receive the bearing pins 180 and 182 to rockably support the yoke means.

The flyball mechanism 148 includes a mounting sleeve portion 188 fixedly carried on the shaft 24 with a portion thereof received in the recess 190 in the drive pinion 26 which rotates therewith. The mounting portion 188 has a pair of bifurcated extensions 192 and 194, each of which pivotally supports a flyball element 196 or 198 on a pin 200 or 202 therethrough. The flyball element 196 has a weight portion 204 and an operating arm 206 movable upon outward pivoting of the weight portion 204. The flyball element 198 has a weight portion 208 and an operating arm 210. The sleeve 212, slidable on the drive shaft, has the intermediate shoulder 215 engageable with the pins 166 and 168. The end of the sleeve 212 adjacent the operating arms has a ball thrust bearing 214 carried thereby, one race of which is engaged by the operating arms 206 and 210 so as to be axially moved thereby.

From the foregoing, it will be seen that the construction of the yoke means is such that the same is substantially balanced about a vertical plane thereby minimizing the requirement of force for automatically shifting from hand- to motor-operation and back again. Furthermore, the arrangement is such that actuation of the motor-drive effects rotation of the flyball mechanism and rocking of the yoke means closely associated therewith so as to completely disconnect the hand-operation connection of the worm-shaft before completion of the clutching movement for power-operation of the valve.

Operation

Having reference particularly to Figures 6 and 7, it will be seen that the arrangement is normally as is seen in Figure 7, i. e. for hand-operation the motor shaft 24 is idle, as is the flyball mechanism 148, and the spring 76 resiliently maintains the reciprocable clutch element 70 in declutched position with the gear 80 enmeshed with the hand drive gear 232. Thus by rotation of the hand wheel 230, the shaft 224 and gear 232 are rotated to drive the worm-shaft by means of the gear 80 splined thereto. The worm 98 is thereby rotated and the worm gear 100 is revolved to raise or lower the valve-stem to move the valve-gate to "open" or "closed" position depending upon the direction of rotation of the hand wheel 230.

Upon actuation of the motor for motor-drive, the motor shaft 24 with the drive pinion 26 and flyball mechanism 148 carried thereby is rotated. The driven gear 46 enmeshed with the pinion 26 idles with the clutch element 44 on the worm-shaft 28. Upon rotation of the flyball mechanism 148 the flyball elements 196 and 198 automatically pivot as a result of the centrifugal force acting on the weight portions 204 and 208. The arms 206 and 210 pivot, of course, with the pivoting of the weight portions and engage the thrust bearing 214 on the sleeve 212 that is slidably carried by the shaft extension 170. In this manner, the sleeve 212 is automatically moved by the flyball mechanism and engages the pins 166 and 168 of the yoke means 146 to effect pivoting thereof from the position of Figure 7 to that of Figure 6. Inasmuch as the pins 156 and 158 are engaged in the groove 82 of the reciprocable clutch element 70, rocking of the yoke means effects sliding of the clutch element to its clutching position with clutch element 44 whereby rotation of the gear 46 effects rotation of the clutch element 70 and the worm shaft 28 to which it is splined. The worm 98 and worm-gear 100 are in turn rotated to effect opening and closing of the valve. Figure 6 shows the arrangement after activation of the motor and it is to be noted that the connection between the hand-operator and the worm-shaft is broken when the motor-drive connection is completed. The rotating flyballs continually exert a force to maintain this arrangement in opposition to the urging of the spring 76 but upon deactuation of the motor drive the arrangement automatically reverts to the arrangement of Figure 7 for hand operation as a result of the urging of the spring 76.

Of course, various modifications and substitutions can be made without departing from the real spirit and scope of my invention as defined in the appended claims, so long as equivalents used for the claimed elements are equivalent in their function as well as conjoint cooperation.

I claim:

1. In a valve control including a motor drive, a worm gear whose rotation effects opening and closing movement of the valve stem, a shaft carrying a worm coacting with the worm gear, and for effecting rotation of the valve-stem, a train of power-transmitting elements between the motor-drive and the gear having as one of its elements a clutch including a driving element and a reciprocable driven element respectively rotatably and nonrotatably carried by the worm shaft, a hand motivatable mechanism including a shaft parallel to the worm-shaft carrying a hand-wheel and a gear, a gear slidably mounted on the worm-shaft for rotation therewith and for reciprocation with the reciprocable clutch element, spring means normally urging the slidable gear and the reciprocable clutch element to a declutching position with the slidable gear in operative engagement with the gear on the hand-wheel shaft for hand-operation of the valve, and rockable yoke means, means responsive to actuation of the motor drive to operate said yoke means to effect longitudinal displacement of the slidable gear and reciprocable clutch element from the gear on the hand-wheel shaft to a clutching position with the driving element for motor drive of the valve.

2. In a valve control including a motor drive, a worm gear whose rotation effects opening and closing movement of the valve stem, a shaft carrying a worm coacting with the worm gear, and for effecting rotation of the valve-stem, a train of power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-wheel and a gear, a gear slidably mounted on the worm-shaft for rotation therewith and for reciprocation with the reciprocable clutch element, spring means normally urging the slidable gear and the reciprocable clutch element to a declutching position with the slidable gear in operative engagement with the gear on the hand-wheel shaft for hand-operation of the valve, and a clutch-shifting yoke rockably mounted on a pivot axis transversely of the axis of the worm-shaft and engageable with the reciprocable element of the clutch for effecting axial shifting of that element and the slidable gear on the worm-shaft from a first position wherein the valve is hand-operated to a second position wherein the slidable gear is disengaged from the gear of the hand-wheel shaft and the reciprocable clutch element is engaged with the driving clutch element for motor-drive of the valve.

3. In a valve control including a motor drive, a worm gear whose rotation effects opening and closing movement of the valve stem, a shaft carrying a worm coacting with the worm gear, and for effecting rotation of the valve-stem, a train of power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-wheel and a gear, a gear slidably mounted on the worm-shaft for rotation therewith and for reciprocation with the reciprocable clutch element, spring means normally urging the slidable gear and the reciprocable clutch element to a declutching position with the slidable gear in operative engagement with the gear on the hand-wheel shaft for hand-operation of the valve, and clutch-shifting yoke rockably mounted on a pivot axis transversely of the axis of the worm-shaft and engageable with the reciprocable element of the clutch for effecting axial shifting of that element and the slidable gear on the worm-shaft from a first position wherein the valve is hand-operated to a second position wherein the slidable gear is disengaged from the gear of the hand-wheel shaft and the reciprocable clutch element is engaged with the driving clutch element for motor-drive of the valve, and automatic means for effecting rocking of the clutch-shifting yoke and operable upon actuation of the motor drive to disconnect the valve from hand-operation.

4. The mechanism according to claim 3 wherein said automatic means includes a flyball assembly mounted for rotation with the motor drive and having engagement with a portion of said yoke.

5. The mechanism according to claim 4 wherein said flyball assembly includes a mounting portion fixed for rotation with a drive shaft of the motor-drive, at least one flyball element pivotally carried on said mounting portion and having an arm pivotally movable therewith, a sleeve slidable on said drive shaft and engaged at one end by said arm whereby upon actuation of the motor drive, the flyball element pivots and its arm axially shifts said sleeve to effect pivoting of said yoke.

6. The mechanism of claim 1 wherein said spring means includes a spring coiled about the worm shaft between the driving clutch element and the reciprocable clutch element.

7. In a valve control including a motor drive, a worm gear whose rotation effects opening and closing movement of the valve stem, a shaft carrying a worm coacting with the worm gear, and for effecting rotation of the valve-stem, a train of power-transmitting elements between the motor-drive and the gear having as one of its elements a clutch including a driving element and a reciprocable driven element respectively rotatably and non-rotatably carried by the worm shaft, a hand motivatable mechanism including a shaft parallel to the worm-shaft carrying a hand-wheel and a gear, a gear slidably mounted on the worm-shaft for rotation therewith and for reciprocation with the reciprocable clutch element, spring means normally urging the slidable gear and the reciprocable clutch element to a declutching position with the slidable gear in operative engagement with the gear on the hand-wheel shaft for hand-operation of the valve, and rockable yoke means substantially balanced about a vertical plane through the axis thereof and operable to effect clutching and to interrupt the connection for hand-operation of the valve and effect operative connection between the motor drive and the valve.

8. In a valve control including a motor drive, a worm-gear whose rotation effects opening and closing movement of the valve stem, a shaft carrying a worm coacting with the worm-gear, and for effecting rotation of the valve stem, a train of power transmitting elements between the motor-drive and the worm-gear having as one of its elements a clutch including a driving element and a reciprocable driven element respectively rotatably and non-rotatably carried by the worm shaft, a hand-operable mechanism including a shaft carrying a hand-wheel and a gear, a gear slidably mounted on the worm-shaft for rotation therewith and for reciprocation with the reciprocable element of the clutch, spring means normally urging the slidable gear and the reciprocable element of the clutch to a declutching position with the slidable gear in operative engagement with the gear on the hand-wheel shaft for hand-operation of the valve, and a clutch-shifting yoke rockably mounted on a pivot axis transversely of the axis of the worm-shaft and engageable with the reciprocable element of the clutch for effecting axial shifting of that element and the slidable gear on the worm-shaft from a first position wherein the valve is hand-operated to a second position wherein the slidable gear is disengaged from the gear of the hand wheel shaft and the reciprocable clutch element is engaged with the driving clutch element for motor drive of the valve, said yoke including a U-shaped portion straddling the reciprocable element of the clutch and substantially coplanar with the pivot axis of the yoke.

9. The mechanism according to claim 8 wherein said yoke has a second U-shaped portion extending oppositely from the first U-shaped portion and substantially coplanar therewith thereby providing a yoke substantially balanced about a vertical plane through the pivot axis.

10. The mechanism according to claim 9 wherein said second U-shaped portion has a pair of substantially aligned inwardly extending pins terminating in juxtaposition to a drive shaft of the motor drive, and means carried by said drive shaft engageable with said pins for effecting pivoting of said yoke from said first position to said second position.

11. The mechanism according to claim 10 wherein said last recited means comprises a pair of flyball elements pivotally mounted for rotation with said drive shaft and outwardly pivoted upon rotation of said drive shaft, each of said flyball elements having an arm pivotally movable therewith, a sleeve slidable on said drive shaft and engageable with said pair of pins with said arms being engageable against said sleeve upon outward pivoting of the flyball elements to axially slide the sleeve to effect pivoting of said yoke between said two positions.

12. In a valve control including a motor drive, a worm gear whose rotation effects opening and closing movement of the valve stem, a shaft carrying a worm coacting with the worm gear, and for effecting rotation of the valve-stem, a train of power-transmitting elements between the motor-drive and the gear having as one of its elements a clutch including a driving element and a reciprocable driven element respectively rotatably and nonrotatably carried by the worm shaft, a hand motivatable mechanism including a shaft parallel to the worm-shaft carrying a hand-wheel and a gear, a gear slidably mounted on the worm-shaft for rotation therewith and for reciprocation with the reciprocable clutch element, spring means normally urging the slidable gear and the reciprocable clutch element to a declutching position with the slidable gear in operative engagement with the gear on the handwheel shaft for hand-operation of the valve, and rockable yoke means operable upon actuation of the motor drive to effect longitudinal displacement of the slidable gear and reciprocable clutch element from the gear on the hand-wheel shaft to a clutching position with the driving element for motor drive of the valve, said reciprocable clutch element and slidable gear being unitary.

13. In a valve control including a motor drive, a worm gear whose rotation effects opening and closing movement of the valve stem, a shaft carrying a worm coacting with the worm gear, and for effecting rotation of the valve stem, a train of power transmitting elements between the motor drive and the gear having as one of its elements a clutch including a driving element and driven element, a hand motivatable mechanism including a shaft spaced from the worm shaft carrying a hand wheel and a gear, a cooperative gear on the worm shaft adapted to be interconnected with the gear on the hand wheel shaft, one of said clutch elements being reciprocably and nonrotatably carried by one of said shafts and the other of said clutch elements being rotatably carried by one of said shafts, spring means normally retaining operative connection between the hand motivatable mechanism and the worm shaft and breaking the operative connection between the motor drive and worm shaft by normally urging the reciprocable clutch element to a declutching position, and rockable yoke means, means responsive to actuation of the motor drive to operate said yoke means to break the operative connection between the hand motivatable mechanism and the worm shaft and to perfect operative connection between the motor drive and worm shaft by effecting displacement of the reciprocable clutch element to a clutching position in opposition to the spring means.

14. In a valve control including a motor drive, a worm gear whose rotation effects opening and closing movement of the valve stem, a shaft carrying a worm coacting with the worm gear, and for effecting rotation of the valve stem, a train of power transmitting elements between the motor drive and the gear having as one of its elements a clutch including a driving element and driven element, said driven element being reciprocable, and said driving and driven elements being respectively rotatably and non-rotatably carried by the worm shaft, a hand motivatable mechanism including a shaft spaced from the worm shaft carrying a hand wheel and a gear, a cooperative gear on the worm shaft adapted to be intermeshed with the gear on the hand wheel shaft, spring means normally retaining operative connection between the hand motivatable mechanism and the worm shaft and breaking the operative connection between the motor drive and worm shaft by normally urging the reciprocable clutch element to a declutching position, and rockable yoke means, means responsive to actuation of the motor drive to operate said yoke means to break the operative connection between the hand motivatable mechanism and the worm shaft and to perfect operative connection between the motor drive and worm shaft by effecting displacement of the reciprocable clutch element to a clutching position in opposition to the spring means.

15. In a valve control including a motor drive, a worm gear whose rotation effects opening and closing movement of the valve stem, a shaft carrying a worm coacting with the worm gear, and for effecting rotation of the valve stem, a train of power transmitting elements between the motor drive and the gear having as one of its elements a clutch including a driving element and driven element, a hand motivatable mechanism including a shaft spaced from the worm shaft carrying a hand wheel and a gear, a cooperative gear on the worm shaft adapted to be interconnected with the gear on the hand wheel shaft, one of said clutch elements being reciprocably and nonrotatably carried by one of said shafts and the other of said clutch elements being rotatably carried by one of said shafts, spring means normally retaining operative connection between the hand motivatable mechanism and the worm shaft and breaking the operative connection between the motor drive and worm shaft by normally urging the reciprocable clutch element to a declutching position, and a clutch shifting yoke rockably mounted on a pivot axis transversely of the axis of the worm shaft and engageable with the reciprocable clutch element for effecting axial shifting of that element from a first position wherein the valve is hand-operated to a second position wherein the reciprocable clutch element is engaged with the driving clutch element for motor drive of the valve.

16. In a valve control including a motor drive, a worm gear whose rotation effects opening and closing movement of the valve stem, a shaft carrying a worm coacting with the worm gear, and for effecting rotation of the valve stem, a train of power transmitting elements between the motor drive and the gear having as one of its elements a clutch including a driving element and driven element, a hand motivatable mechanism including a shaft spaced from the worm shaft carrying a hand wheel and a gear, a cooperative gear on the worm shaft adapted to be interconnected with the gear on the hand wheel shaft, one of said clutch elements being reciprocably and nonrotatably carried by one of said shafts and the other of said clutch elements being rotatably carried by one of said shafts, spring means normally retaining operative connection between the hand motivatable mechanism and the worm shaft and breaking the operative connection between the motor drive and worm shaft by normally urging the reciprocable clutch element to a declutching position, and rockable yoke means operable upon actuation of the motor drive to break the operative connection between the hand motivatable mechanism and the worm shaft and to perfect operative connection between the motor drive and worm shaft by effecting displacement of the reciprocable clutch element to a clutching position in opposition to the spring means, and automatic means for effecting rocking of the clutch-shifting yoke means and operable upon actuation of the motor drive to disconnect the valve from hand-operation.

17. The mechanism according to claim 16 wherein said automatic means includes a flyball assembly mounted for rotation with the motor drive and having engagement with a portion of said yoke means.

18. The mechanism according to claim 17 wherein said flyball assembly includes a mounting portion fixed for rotation with a drive shaft of the motor-drive, at least one flyball element pivotally carried on said mounting portion and having an arm pivotally movable therewith, a sleeve slidable on said drive shaft and engaged at one end by said arm whereby upon actuation of the motor drive, the flyball element pivots and its arm axially shifts said sleeve to effect pivoting of said yoke means.

References Cited in the file of this patent

UNITED STATES PATENTS

| Number | Name | Date |
|---|---|---|
| 2,592,374 | Ball | April 8, 1952 |